(12) United States Patent
Xu et al.

(10) Patent No.: US 7,099,405 B2
(45) Date of Patent: Aug. 29, 2006

(54) COMMUNICATION SYSTEMS WITH HYBRID AUTOMATIC REPEAT REQUESTS (HARQ) AND RATE MATCHING

(75) Inventors: Chang Qing Xu, Singapore (SG); Ju Yan Pan, Singapore (SG); Hiroshi Katsuragawa, Singapore (SG)

(73) Assignee: Oki Techno Centre (Singapore) Pte Ltd., Singapore (SG)

( * ) Notice: Subject to any disclaimer, the term of this patent is extended or adjusted under 35 U.S.C. 154(b) by 770 days.

(21) Appl. No.: 10/193,146

(22) Filed: Jul. 12, 2002

(65) Prior Publication Data

US 2003/0138059 A1    Jul. 24, 2003

(30) Foreign Application Priority Data

Jan. 17, 2002    (SG) .............................. 200200315-0

(51) Int. Cl.
*H03K 9/00*    (2006.01)
(52) U.S. Cl. ........................ 375/316; 714/748; 714/749
(58) Field of Classification Search ................ 375/316, 375/152, 261; 714/748, 749, 756; 370/216, 370/394, 328
See application file for complete search history.

(56) References Cited

U.S. PATENT DOCUMENTS

| 5,633,881 | A * | 5/1997 | Zehavi et al. ................ 714/756 |
| 6,865,233 | B1 * | 3/2005 | Eriksson et al. ............. 375/261 |
| 2002/0021698 | A1 * | 2/2002 | Lee et al. .................... 370/394 |
| 2002/0145985 | A1 * | 10/2002 | Love et al. .................. 370/328 |
| 2002/0159384 | A1 * | 10/2002 | Classon et al. .............. 370/216 |
| 2003/0133497 | A1 * | 7/2003 | Kinjo et al. ................. 375/152 |

FOREIGN PATENT DOCUMENTS

| EP | 1018816 A1 * | 7/2000 |
| WO | WO 01/03369 | 1/2001 |
| WO | WO 01/37433 | 5/2001 |
| WO | WO 01/91355 | 11/2001 |

OTHER PUBLICATIONS

3GPP TR 25.858, V5.0.0 (Mar. 2002), 3rd Generation Partnership Project; Technical Specification Group Radio Access Network; High Speed Downlink Packet Access; Physical Layer Aspects (Release 5), pp. 1-31.

* cited by examiner

*Primary Examiner*—Mohammed Ghayour
*Assistant Examiner*—Leila Malek
(74) *Attorney, Agent, or Firm*—Venable LLP; Michael A. Sartori

(57) ABSTRACT

A receiver for a HARQ communication system includes a buffer for storing a signal derived from a message. The signal is transmitted to the receiver at a first coding rate. The receiver also includes a decoder which accepts signals having a second coding rate, and a rate dematcher which converts signals from the first coding rate to the second coding rate. The rate dematcher is arranged to process either a combination of the received signals (in the case that the received signals are noisy versions of identical signals transmitted within the communications network) or simply the set of received signals. In either case, the dematcher forwards the results to the decoder. Provided that the second coding rate is lower than the first coding rate, the amount of memory required by the buffer is reduced by locating the buffer before the rate dematching unit.

14 Claims, 1 Drawing Sheet

COMMUNICATION SYSTEMS WITH HYBRID AUTOMATIC REPEAT REQUESTS (HARQ) AND RATE MATCHING

FIELD OF THE INVENTION

The present invention relates to communication systems in which employ both hybrid automatic repeat requests and rate matching.

DESCRIPTION OF BACKGROUND ART

It is extremely common in modern communication systems that a unit which is to transmit a message (here referred to as a "transmitter") to a unit at a distance ("receiver") uses the message to generate an encoded signal and transmits the signal (e.g. as a data packet) to the receiver. For this reason, the transmitter includes an encoder and the receiver includes a decoder. Many coding schemes are known, and coding schemes differ in the ratio of the number of bits input to the encoder to the number of bits output from the encoder (the "coding rate"). One well known coding scheme is called Turbo Coding. Many decoders function by a well known process known as forward error correction (FEC).

In the case that the receiver does not correctly receive a signal, it is well known for the receiver to trigger an automatic retransmission of a signal derived from the message. This triggering is known as an automatic repeat request (ARQ). For example, the receiver may trigger the second signal by transmitting to the transmitter a NACK ("no acknowledgement") signal. The receiver stores the multiple signals it receives, and uses them in combination to try to reconstruct the message ("joint decoding"). Note that the second and subsequent signals may simply be identical to the first signal (in which case the joint decoding is by a process called Chase combining), or they may be different but still derived from the same message (Incremental Redundancy).

Hybrid Automatic Repeat Request (HARQ) signal transmission is defined as any data communication method which combines automatic repeat requests (ARQ) with forward error correction (FEC) and which saves failed decoding attempts for future joint decoding. The principle of HARQ is to buffer data that were not decoded successfully and subsequently combine the buffered data with retransmissions.

To meet the different demands of different services, many modern communication systems need to support a set of coding rates to provide different coding gains for different services. A straightforward method to implement this is to employ multiple encoders in the transmitter and multiple decoders in the receiver, but this method results in huge complexity in the communication equipment. Another more practical method is to employ only one encoder and decoder. The encoder provides a pre-chosen coding rate, and other desired coding rates can be obtained by "rate matching". That is, when it is desired to transmit data at a coding rate higher than that of the encoder, bits puncturing (i.e. simple omission of bits produced by the encoder) is performed to obtain the desired coding rates. When it is desired to transmit data at a coding rate lower than the pre-chosen coding rate, bit repetition will be conducted to obtain the desired coding rate.

FIG. 1 shows the structure of such a known transmitter. An encoder 1 receives a message to be encoded (from the left of the diagram), encodes it, and transmits it to a rate matching unit 3, which performs puncturing or bit repetition to produce a desired coding rate. The resultant data is then transmitted to an signal transmission unit 5 for transmission. For example, in the case that the transmission is by radio, the signal transmission unit 5 may be an aerial unit, but the present invention is not limited in this respect.

The corresponding known receiver is shown in FIG. 2, and corresponds to what is shown in the standard document "3GPP TR25.848: Physical layer aspects of UTRA high speed downlink packet access" (the disclosure of which is incorporated herein by reference in its entirety). It includes a decoder 13 selected correspondingly to the encoder 1. The receiver further includes a signal reception unit 7 (e.g. including an aerial unit in the case the transmission is by radio) which receives the signal transmitted by the signal transmission unit 5, and transmits it to a rate dematching unit 9, which converts the rate to one acceptable to the decoder 13. The results are stored in buffer 11, and transmitted to the decoder 13. In the case that the decoder 13 determines (by known algorithms) that there is a fault in the reconstruction of the message, the receiver sends a NACK signal (using components which are not shown in FIG. 2) to the transmitter of FIG. 1. The transmitter then sends the next signal derived from the message. The newly received signal is added to the buffer 11. The decoder 13 then performs joint decoding of the multiple received versions of the signal.

The buffer 11 requires quite a large memory size for high data rate communications. For example, 3rd generation mobile wireless communications will support peak data rate of 2 Mbps to 10 Mbps. Therefore, this extra buffer memory will introduce a lot of cost to the user equipment.

SUMMARY OF THE INVENTION

The present invention aims to provide new and useful communication methods and systems.

In particular, the invention proposes a HARQ system with rate matching and having a reduced memory requirement.

In general terms, the present invention proposes that the receiver of a HARQ communication system should be capable of buffering received signals in the form they are in before they are processed by the rate dematching unit. The advantage of this is that, in the case that the rate dematching unit increases the number of bits, the amount of memory required by the buffering is reduced. The memory size required by HARQ buffering in a modern communication system strongly affects the cost of the communication systems. Therefore, the present invention may help reduce the cost of these communication systems, especially the user equipment.

Specifically, the present invention proposes a receiver for a communication system in which messages are transmitted as encoded signals derived from the messages, the receiver comprising:

a signal reception unit for receiving signals;

a buffer for storing signals received by the signal reception unit;

a rate dematching unit for receiving signals from the buffer and converting their coding rate to a predefined coding rate; and a decoder for receiving the converted signals from the rate dematching unit, and decoding them to reconstruct the messages, the receiver being arranged, upon detection that a message has not been correctly decoded from a first signal, to request transmission within the communication system of a further signal derived from the message, and the encoder being arranged to process data derived from the further signal and from the first signal stored in the buffer.

In a first case, the multiple signals derived from a single message are different from each other (incremental redundancy). In this case, the rate dematching unit converts all the accumulated signals, and transmits the converted signals to the encoder for joint decoding.

In a second case, the buffer the signals are identical, and the receiver combines the multiple accumulated signals and transmits the combination signal to the rate dematching unit. Thus, the receiver performs Chase combining of the signals before the dematching.

The rate dematching unit is preferably operable to convert signals at a selected one of a plurality of coding rates to the predetermined coding rate.

The present invention may alternatively be expressed as a communication system including at least one receiver as defined above.

Alternatively, the invention may be expressed as the method performed by a receiver of a communication system. In this expression, the present invention provides a method for reconstructing a message from a signal derived from the message, the signal encoding the message at a first coding rate and being transmitted within a communication system, the method comprising:

(i) receiving the signal;
(ii) storing the signal at the first coding rate in a buffer;
(iii) converting the first coding rate of the signal to a second coding rate;
(iv) decoding the converted signal to attempt to reconstruct the message;
(v) determining whether the message is correctly reconstructed; and
(vi) upon detection that the message was not been correctly reconstructed, triggering transmission within the communication system of a further signal, the further signal being derived from the message and having the first coding rate,
(vii) attempting to reconstruct the message from the further signal and the signal stored in the buffer.

In the case that the multiple signals transmitted within the communications network are identical, step (vii) preferably includes combining the multiple signals (Chase combining), converting the coding rate of the combined data to the second coding rate and attempting to reconstruct the message from the converted data.

Alternatively, in the case that the multiple signals transmitted within the communications network are not identical (e.g. Incremental Redundancy), step (vii) preferably includes converting each of the accumulated signals to the second coding rate and attempting to reconstruct the message from the set of converted signals.

In either case, a further determination can be carried out of whether the message has been correctly reconstructed, and if not a further signal can be requested from the transmitter, after which step (vii) is performed again. This loop can be performed a predetermined maximum number of times, or alternatively until the message is correctly reconstructed.

As explained above, the present invention makes it possible to reduce the amount of memory required for buffering in the case that the rate dematching unit increases the number of bits. However, conversely, if the coding rate used in the transmission is lower than the coding rate acceptable to the decoder, then the rate dematching unit reduces the number of bits, so that placing the buffer before the rate dematching unit increases the buffer memory requirement. Therefore, in the case that the receiver of the present invention is also intended to be used in cases in which the transmission coding rate is lower than the decoder coding rate, we propose that the receiver should preferably be arranged to switch between buffering the signals before the rate dematching unit (as described above) and buffering the signals after the rate dematching unit (as in the prior art), according to whether coding rate used in the transmission is respectively higher or lower than the one acceptable to the decoder.

BRIEF DESCRIPTION OF THE FIGURES

Non-limiting embodiments of the invention will now be described in detail with reference to the following figures, in which.

DETAILED DESCRIPTION OF THE EMBODIMENTS

Figure 2:
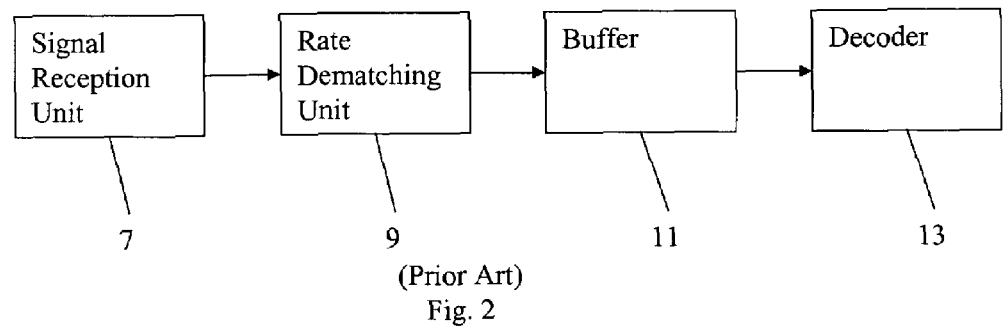
FIG. 2 shows a known receiver of a communication system.

We will consider two embodiments of the present invention in turn. As discussed below, both have the general structure shown in FIG. 3, in which the same reference numerals used in FIG. 2 are employed to label units having corresponding respective functions. In particular, the receiver of FIG. 3 includes a signal reception unit 7 which transmits signals to a buffer 11. The buffer accumulates one or more signals derived from a single message, transmits them all to a rate dematching unit 9. The rate dematching unit 9 converts the coding rate of the data it receives to that appropriate for a decoder 13. Note that the output of the dematching unit 9 is preferably not stored by the decoder 13 (at least after the decoder 13 has completed the decoding).

Figure 1:
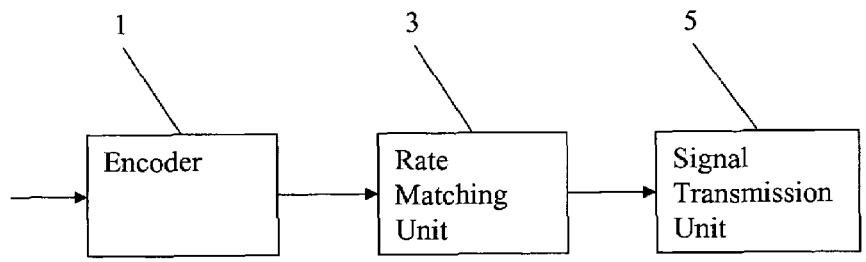
FIG. 1 shows a known transmitter of a communication system.
Figure 3:
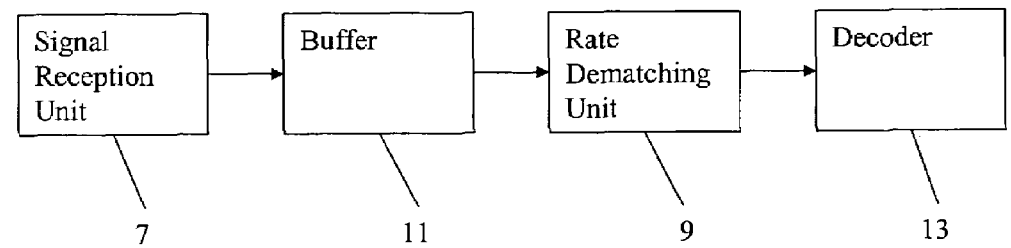
FIG. 3 shows the general structure of a receiver according to the present invention.

The receiver of FIG. 3, like that of FIG. 2, is capable of operating in combination with the known transmitter of FIG. 1, to form a communication system. In practice, the communication system may comprise multiple transmitters and/or receivers, of which any one or more receivers may be embodiments of the present invention. Furthermore, any receiver may be part of a physical unit which is also capable of functioning as a transmitter.

We now turn to the first embodiment of the invention, having the structure of FIG. 3.

This embodiment is a receiver for a code division multiple access (CDMA) communication system. The encoder 1 of the transmitter is a Turbo encoder with a pre-chosen coding rate of $\frac{1}{3}$. Similarly, the decoder 13 is a Turbo decoder accepting signals with this coding rate. The spreading factor is 16 and the chip rate is 3.84 Mchips/sec. The number of multicodes is 5. The transmission time interval (TTI) is 2 ms. Two types of modulation and coding schemes are required to be supported, for example QPSK with coding rate of $\frac{1}{2}$, and QPSQ with coding rate of $\frac{3}{4}$. The HARQ mechanism is stop and wait (SAW) with 6 channels. In the case that a NACK signal is received the transmitter retransmits a signal identical to the first signal transmitted to the receiver. Naturally, each of these identical signals transmitted within the communications network are received with differing noise.

The operation of the receiver in this case is as follows:

Step 1: If it is found that the message is not correctly reconstructed from the first signal transmitted by the transmitter, the received signal before rate dematching is stored at the HARQ buffer 11. Meanwhile, no acknowledgement (NACK) will be sent to the transmitter, so as to trigger a further transmission of an identical signal.

Step 2: Upon receiving next signal, it is transmitted to the buffer 11 and stored there. All the accumulated data in the buffer 11 is now combined (Chase combining) to produce a bit stream of the same length as any one of the stored signals. This is "soft combining". The result is transmitted to the rate dematching unit 9. The result is decoded by the Turbo decoder 13.

Step 3: If the result is the message decoded with an error, go back to step 1 until the maximum transmission limitation (i.e. a predetermined maximum number of times the signal can be transmitted) is reached.

TABLE 1

|  | Prior art | First embodiment | Percentage change |
| --- | --- | --- | --- |
| QPSK ¼ | 43704 bits | 29160 bits | −33% |
| QPSK ¾ | 65304 bits | 28992 bits | −56% |

Table 1 shows a comparison of the required memory size per TTI in the prior art receiver of FIG. 2 and in the first embodiment. The final column shows the advantage of the first embodiment compared to the prior art, quoted as a percentage. Evidently the required size of the buffer 11 can be reduced by as much as more than half with the proposed scheme.

Moreover, the time taken by the soft combining operation is also reduced. The reason is that the soft combining is conducted before rate dematching.

We turn now to the second embodiment. This also has the structure of FIG. 3, but in this case the signals which are transmitted within the communications network are not all identical, but are derived from the message in different ways. Thus, as is well know, the signals should not be combined to reconstruct the message using Chase combining, but rather Incremental Redundancy (IR) will be employed to implement soft combining. IR is another well known implementation of HARQ soft combining wherein instead of sending simple repeats of the entire coded data, additional redundancy information is incrementally transmitted if the decoding fails on the first attempt.

The HARQ operation in the second embodiment is different from that of the first embodiment in that only two transmissions are allowed. The whole procedure of the proposed scheme is as follows:

Step 1: If it is found that the first message is not correctly reconstructed from the first signal received by the receiver, the received data before rate dematching is stored at the HARQ buffer 11. Meanwhile, a NACK is sent to the transmitter.

Step 2: Upon receiving the second signal, the second signal is subject to rate dematching by the rate dematcher 9 and transmitted to a decoder buffer (not shown in FIG. 3) of the Turbo decoder 13. Then, the data stored in the HARQ buffer 11 will be transmitted through the dematcher 9 again and combined with the data stored in the decoder buffer. After that, the combined data will be decoded by Turbo decoder 13.

It can be seen that in the second embodiment, the rate dematching is performed twice for the first signal.

Note that in the second embodiment, since the maximum number of transmission is two it is not necessary to store the second signal in the buffer. However, in variations of the embodiment in which the maximum number of transmissions is higher than two, the second signals (and any further signals up to the penultimate signal) should be stored in the buffer.

The size of the HARQ buffer 11 can be reduced more than half with the second embodiment, compared to the prior art receiver of FIG. 2. However, unlike the first embodiment, the operation time for soft combining cannot be reduced. This is because the soft combining is performed after rate dematching in the second embodiment.

Although the invention has been described above in relation to only two embodiments, many variations are possible within the scope of the invention as will be clear to a skilled reader.

For example, although in the examples given above the coding rate of the signals received by the receiver embodiments is higher than the coding rate acceptable to the decoder 13, the invention is not limited in this respect. Rather the receiver embodiments are preferably capable of receiving and processing signals having a coding rate which is lower than the coding rate acceptable to the decoder 13. When the signals received by the signal receiving unit 7 have such a lower coding rate, the receiver may be arranged to switch over to have the configuration shown in FIG. 2 (i.e. the configuration of the prior art), in which the signal received by the signal reception unit 7 is transmitted directly to the rate dematching unit 9, and the output of the rate dematching unit 9 is stored in the buffer 11. When the signal received by the signal receiving unit 7 reverts to one having a higher coding rate than the decoder, the receiver switches back to the configuration of FIG. 3.

Furthermore, although the elements of the embodiments are described above as "units", in fact they do not have to be physically separate. Rather, they may for example be implemented as software modules running on any number of integrated circuits.

Furthermore, although the embodiments employ SAW HARQ, the invention is not limited in this respect, and is equally applicable to other HARQ techniques employing soft combining, such as SR (selective repeating) which is well known to a skilled reader.

The invention claimed is:

1. A receiver for a communication system in which messages are transmitted as encoded signals derived from the messages, the receiver comprising:
   a signal reception unit for receiving signals;
   a buffer for storing received signals;
   a rate dematching unit for receiving signals at a selected one of a plurality of coding rates from the buffer, or from the signal reception unit, and converting their coding rate to a predefined coding rate; and
   a decoder for receiving the converted signals from the rate dematching unit or from the buffer, and decoding them to reconstruct the messages,
   the receiver being arranged, upon detection that a message has not been correctly decoded from a first signal, to request transmission within the communication system of a further signal derived from the message, and the decoder being arranged to process data derived from the further signal and from the first signal stored in the buffer, the receiver further being arranged, if the selected coding rate is higher than the predefined coding rate, to store in the buffer the signal received by the signal reception unit and to transmit the signal stored in the buffer to the rate dematching unit for conversion, and, if the selected coding rate is lower than the predefined coding rate, to transmit the signal received by the signal reception unit to the rate dematching unit, and to store in the buffer the converted signals from the rate dematching unit.

2. A receiver according to claim 1 in which the buffer is arranged, if the selected coding rate is higher than the predefined coding rate, upon the further signal being received by the receiver, to transmit both the further signal and the signal stored in the buffer to the rate dematching unit for conversion to the predefined coding rate and transmission to the decoder for joint decoding.

3. A receiver according to claim 1 in which the buffer is arranged, if the selected coding rate is higher than the predefined coding rate, upon the further signal being received by the receiver, to combine the further signal with one or more signals stored in the buffer and transmit the combined signal to the rate dematching unit.

4. A receiver according to claim 1 in which the buffer is arranged to store the further signal.

5. A communication system comprising a transmitter for transmitting signals derived from a message as encoded signals, and a receiver according to claim 1.

6. A method for reconstructing a message from a signal derived from the message, the signal encoding the message at a first coding rate and being transmitted within a communication system, the method comprising:
 (i) receiving the signal;
 (ii) if the first coding rate is higher than a predefined coding rate, storing the signal at the first coding rate in a buffer then converting the first coding rate of the signal to the predefined coding rate, or, if the first coding rate is lower than the predefined coding rate, converting the first coding rate of the signal to the predefined coding rate then storing the signal at the predefined coding rate in a buffer;
 (iii) decoding the converted signal to attempt to reconstruct the message;
 (iv) determining whether the message is correctly reconstructed; and
 (v) upon detection that the message has not been correctly reconstructed, triggering transmission within the communication system of a further signal, the further signal being derived from the message and having the first coding rate,
 (vi) attempting to reconstruct the message from the further signal and the signal stored in the buffer.

7. A method according to claim 6 in which the multiple signals transmitted within the communication system are identical, and, if the first coding rate is higher than the predefined coding rate, step (vi) includes combining the multiple signals, converting the combined signal to the predefined coding rate and attempting to reconstruct the message from the converted signal.

8. A method according to claim 6 in which, if the first coding rate is higher than the predefined coding rate, step (vi) includes converting the further signal and the signal stored in the buffer to the predefined coding rate and attempting to reconstruct the message from the set of converted signals.

9. A method according to claim 8 in which the multiple signals transmitted within the communication system are not identical.

10. A method according to claim 6 in which the sequence of steps (iv), (v) and (vi) is performed again at least once.

11. A receiver according to claim 1 in which the buffer is arranged, if the selected coding rate is lower than the predefined coding rate, upon the further signal being received by the receiver, to transmit the further signal to the rate dematching unit for conversion to the predefined coding rate and to transmit the converted further signal and the converted signal stored in the buffer to the decoder for decoding.

12. A receiver according to claim 1 in which the buffer is arranged, if the selected coding rate is lower than the predefined coding rate, upon the further signal being received by the receiver, to transmit the further signal to the rate dematching unit for conversion to the predefined coding rate, to combine the converted further signal with one or more converted signals stored in the buffer and to transmit the combined converted signal to the decoder.

13. A method according to claim 6 in which the multiple signals transmitted within the communication system are identical and, if the first coding rate is lower than the predefined coding rate, step (vi) includes converting each of the multiple signals to the predefined coding rate, combining the multiple converted signals and attempting to reconstruct the message from the combined converted signal.

14. A method according to claim 6 in which, if the first coding rate is lower than the predefined coding rate, step (vi) includes converting the further signal to the predefined coding rate and attempting to reconstruct the message from the converted signal stored in the buffer and the converted further signal.

* * * * *